C. WHITE.
PISTON AND PISTON ROD CONNECTION.
APPLICATION FILED AUG. 7, 1915. RENEWED JULY 20, 1916.
1,195,936. Patented Aug. 22, 1916.
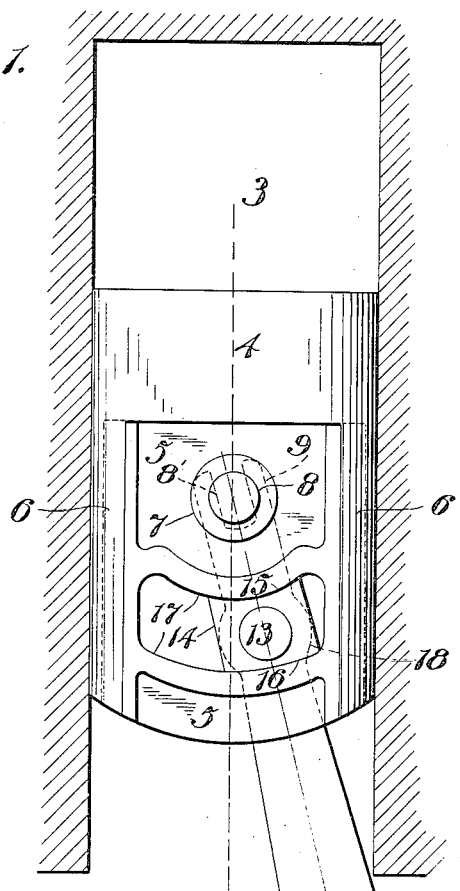
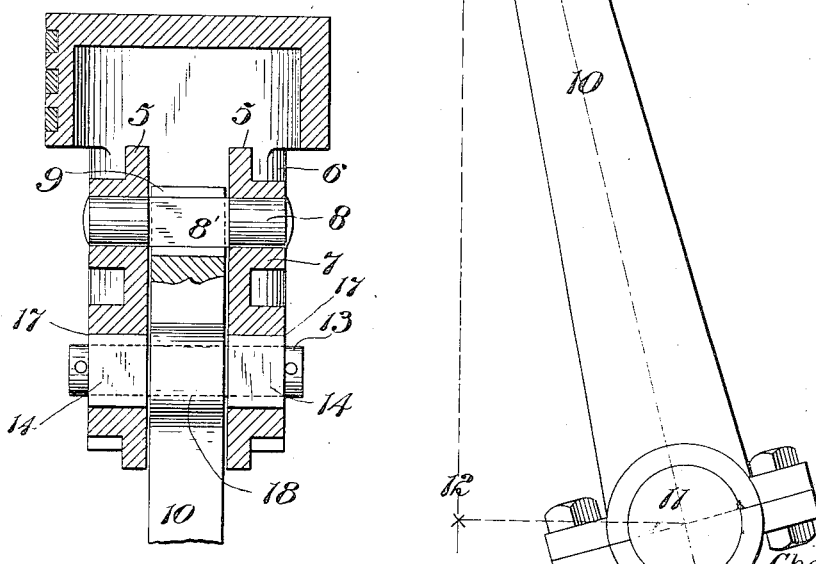
Inventor:
Charles White.

UNITED STATES PATENT OFFICE.

CHARLES WHITE, OF BALTIMORE, MARYLAND.

PISTON AND PISTON-ROD CONNECTION.

1,195,936.　　　　　　Specification of Letters Patent.　　Patented Aug. 22, 1916.

Application filed August 7, 1915, Serial No. 44,202. Renewed July 20, 1916. Serial No. 110,353.

*To all whom it may concern:*

Be it known that I, CHARLES WHITE, a citizen of the United States, residing at Baltimore, Maryland, have invented certain new and useful Improvements in Piston and Piston-Rod Connections, of which the following is a specification.

The invention consists in the features and combination and arrangement of parts hereinafter described and particularly pointed out in the claims.

In the drawings; Figure 1 is a diagrammatic view of a cylinder and piston with the connecting rod and crank. Fig. 2 is a longitudinal sectional view of the piston with the connecting rod in place partly in section.

In these drawings I show diagrammatically a cylinder 3 with its piston 4. This piston is formed with a cylindrical head portion and a reduced lower portion consisting of transverse walls 5 connecting the segments or sides 6 which conform in curve to the wall of the cylinder. In these transverse walls 5 bearings are provided for a pin 8, said bearings being indicated at 7. The pin 8 has cylindrical ends adapted to turn in these bearings and a central portion 8' with flat sides. This central portion is engaged by the slotted or forked upper end 9 of the connecting rod 10 which at its other end is connected with the crank pin 11, the center of the crank being indicated at 12 in line with the axis of the cylinder and piston. The driving connection or wrist pin connection between the piston and the connecting rod is provided by a pin 13 carried by blocks 14 having curved upper and lower surfaces 15 and 16 conforming to the curved walls of guide-ways 17 formed in the side walls 5. These guide-ways are concentric with the center of the pin 8.

The connecting rod 10 has an enlarged portion at 18 through which the wrist pin 13 extends. There is one of the guide blocks 14 for each end of the wrist pin 13, the connecting rod engaging the central portion of said wrist pin as shown in Fig. 2, which also illustrates the fact that the connecting rod works between the side webs or walls 5. The power from the piston is transmitted to the connecting rod through the wrist pin 13 and conversely the pull of the connecting rod, for instance on the suction stroke is transmitted to the piston through the said wrist pin 13, this being in contra-distinction to the usual practice in which the power is transmitted through a pin located in the plane of the axial center of the piston and immovably fixed in relation to said axial plane, as would be the case were the connecting rod 10 pivoted to the piston only by the pin 8.

It will be observed from Fig. 1 that with the crank on its quarter stroke the connecting rod extends at an angle to the axis of the piston and that the wrist pin lies to one side of said axis and on the same side thereof upon which the crank pin is now located. As the crank turns and the connecting rod approaches the axial plane of the piston the wrist pin 13 shifts in the guide 17 and approaches the axial plane until when the parts are on dead centers, the wrist pin 13 will be lying directly in the axial plane of the piston and as the crank continues to move and the crank pin departs from the dead center and moves toward its other quarter stroke position the wrist pin will continue shifting, being thus carried across the dead center and occupying positions to one side of the axial center of the piston corresponding to the angular position of the crank pin. In these movements of the connecting rod its upper end will pivot about the pin 8, it being understood that the sole function of this pin is to control this pivotal movement and insure the shifting of the wrist pin from side to side of the axial center of the piston as the crank continues its rotation and it will be understood further that the pin 8 does not perform any function of transmitting the power between the piston and the connecting rod but that this function is performed entirely by the shifting wrist pin.

The shifting wrist pin takes the full strain exerted upon the piston and none of this strain is taken by the centrally arranged pin 8 which merely acts as a guide or controller for the wrist pin to insure its shifting properly within the prescribed limits.

I do not limit myself to the particular form or detail of the connection herein described. Where, for instance, I refer to a pin and slot or fork connection at 8, I mean by this that the pin 8 is so coupled to the end of the piston rod that the power will not be transmitted through this pin.

It will be noticed that the piston is provided, in effect, with two tracks or ways 17 concentric with each other, and that the block 14 constitutes a sliding connection between the piston and piston rod movable along said tracks or ways as the rod assumes different angular positions.

By my improvement I get long wearing surfaces between the shifting block and the curved guides of the piston.

I claim:—

1. In combination with a piston and cylinder, a crank pin and connecting rod and a shifting wrist pin forming the connection between said connecting rod and piston, said wrist pin shifting from one side to the other of the axial line of the piston in accordance with the movement of the crank pin to one side or the other of said axial line, substantially as described.

2. In combination with a piston and cylinder, a crank with its pin and connecting rod, said connecting rod being controlled by a pivot on the piston, guide means on the piston and a wrist pin to transmit the power between the piston and the connecting rod, said wrist pin being guided by said guide means and shifting from side to side of the center line of the piston as the connecting rod assumes different angular positions in relation to said center line, substantially as described.

3. In combination with a piston and cylinder, a crank pin and connecting rod, a slot and pin connection between the connecting rod and piston to control the pivotal movement of said connecting rod and a wrist pin connection between said piston and connecting rod with a guide-way carried by the piston for the said wrist pin, substantially as described.

4. In combination with a piston and cylinder, a crank and connecting rod, a shifting wrist pin connection between the connecting rod and piston, said wrist pin moving from side to side of the axis of the piston to accord with the movement of the crank pin and controlling means to control the pivotal movement of the connecting rod in relation to the piston, substantially as described.

5. In combination with a piston and cylinder, a connecting rod and crank, controlling means consisting of a pin and slot or forked connection between the end of the connecting rod and the piston and a wrist pin connection intermediate the said pin and slot connection and the crank and a guide on the piston concentric with the pivot pin, said guide receiving the wrist pin to permit the same to shift from side to side of the center of the piston, substantially as described.

6. In combination a piston, a connecting rod, means for controlling the pivotal movement of the connecting rod in relation to the piston, guide means on the piston concentric with said controlling means, a block or blocks movable in the guide way or ways, a wrist pin connected with the connecting rod and carried by the said block or blocks, substantially as described.

7. In combination with a piston and cylinder, a crank pin and connecting rod, and a shifting connection between said connecting rod and piston, said connection shifting from one side to the other of the axial line of the piston in accordance with the movement of the crank pin to one side or the other of said axial line.

8. In combination with a cylinder, a piston, piston rod and crank pin, said piston having two curved tracks or ways concentric with each other, and a sliding connection between the piston and piston rod movable along said tracks or ways as the piston rod assumes different angular positions in relation to the piston.

In testimony whereof, I affix my signature in presence of two witnesses.

CHARLES WHITE.

Witnesses:
RICHARD B. PUE,
EILEEN A. HEMSLEY.